United States Patent
Klish et al.

(10) Patent No.: US 12,056,113 B2
(45) Date of Patent: Aug. 6, 2024

(54) COMPUTERIZED SYSTEM AND METHOD FOR PERFORMING PARAMETERIZATION OF COLUMNS IN A VIRTUAL SEMANTIC LAYER

(71) Applicant: YAHOO ASSETS LLC, Dulles, VA (US)

(72) Inventors: Aaron J. Klish, Savoy, IL (US); Moiz Arafat, Broadlands, VA (US); Jonathan Kilroy, Mahomet, IL (US); Rishi Agarwal, Herndon, VA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 17/488,363

(22) Filed: Sep. 29, 2021

(65) Prior Publication Data
US 2023/0115504 A1 Apr. 13, 2023

(51) Int. Cl.
*G06F 15/16* (2006.01)
*G06F 16/22* (2019.01)
*G06F 16/23* (2019.01)
*G06F 16/2453* (2019.01)

(52) U.S. Cl.
CPC ........ *G06F 16/2365* (2019.01); *G06F 16/221* (2019.01); *G06F 16/24537* (2019.01)

(58) Field of Classification Search
None
See application file for complete search history.

(56) References Cited

U.S. PATENT DOCUMENTS

| | | | | |
|---|---|---|---|---|
| 10,452,650 | B1 * | 10/2019 | Monaharan | G06F 16/2445 |
| 2007/0143248 | A1 * | 6/2007 | Uppala | G06F 16/2453 |
| 2012/0016897 | A1 * | 1/2012 | Tulumbas | G06F 16/9566 |
| | | | | 707/E17.069 |
| 2014/0082033 | A1 * | 3/2014 | Meriwether | G06F 16/182 |
| | | | | 707/827 |
| 2019/0228095 | A1 * | 7/2019 | Ergun | G06F 16/951 |

* cited by examiner

*Primary Examiner* — Alex Gofman
(74) *Attorney, Agent, or Firm* — James J. DeCarlo; Greenberg Traurig, LLP

(57) ABSTRACT

The disclosed systems and methods provide a novel framework that parameterizes columns in a templated virtual semantic layer. The disclosed framework enables inter- and cross-column relationships between stored data within a SQL database to be determined and stored, and then leveraged at query time to enable an optimized search of the data within the database. The disclosed framework enables a database to be construed, modified and/or configured according to a hierarchy, and/or with types of metadata, that corresponds to the determined column relationships. This not only reduces the amount of data stored and reduces the time to process queries, but also enables a more streamlined approach for searches to be constructed and executed, which can increase the performance of the database and the operations of systems that are backed by the database.

17 Claims, 5 Drawing Sheets

COMPUTERIZED SYSTEM AND METHOD FOR PERFORMING PARAMETERIZATION OF COLUMNS IN A VIRTUAL SEMANTIC LAYER

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to query optimization, and more particularly to providing a virtual semantic layer that uses templated Structured Query Language (SQL) to execute parameterized queries for an optimized database search.

BACKGROUND

According to ANSI® (American National Standards Institute), SQL is the standard language for relational database management systems. SQL statements are used to perform tasks, such as, but not limited to, retrieve data from a database, update data on a database, and the like. The standard SQL commands such as "Select," "Insert," "Update," "Delete," "Create," and "Drop" can be used for most common and proprietary database systems.

SUMMARY

One of the functions of business intelligence tools and data analytic applications is to simplify data that is consumed and analyzed by end users. A primary mechanism to perform this is a semantic layer. Semantic layers present data as a set of tables with measures (e.g., numeric facts about data that can be aggregated) and dimensions (e.g., attributes that describe data). While tables, measures and dimensions are exposed through the semantic layer to users as simple names, they often map to complex formulas, functions, rules and queries that translate a complex physical model to the simpler semantic model.

In a virtual semantic layer, the translation between the complex physical and simple logical models can be performed at query time through a set of predefined rules. A representation of the rules is a set of predefined SQL fragments for the definition of tables, measures, dimensions and the relationships between tables (e.g., joins). In some embodiments, the semantic layer can stitch the fragments together into complete queries depending on the table and columns selected in a given client query. Because the queries are dynamic, the fragments can combine native SQL with templated variables for column and table names. As discussed in more detail below, the variables can be substituted by SQL generation logic with aliases that allow the logical models to construct more complex queries than the physical names would allow.

Semantic layers are intended to simplify the presentation of data to end users. Semantic layers provide users with functionality to construct queries by selecting the table, measures and dimensions that are desired to be explored. The selected columns can then translated into a more complex native SQL query against an underlying database.

One of the challenges with this approach is that the cardinality of columns (measures and dimensions) can get large over time, which can lead to inaccuracies in the way data is managed, hosted, integrated with other data (e.g., nested relationships), thereby causing inaccurate and/or inefficient search processing.

By way of a non-limiting example, consider the task of exposing a "revenue" measure to end users, then adding varying currency values so users can select specific revenues in a target currency. Currently, there are 180 currencies worldwide, and many, if not all, require different measures, which the user can select from.

Under current approaches, it is unwieldy to build navigation around these varying currency values because there is no hierarchy or metadata to reduce the list of currency items from which a user can select a measure. The disclosed systems and methods address these technical shortcomings, among others, by providing a simplified and computationally efficient approach that can parameterize the measure column with an argument (or function, used interchangeably) for currency (a "currency argument"). In this way, the user can select the measure (revenue), and then can select the argument (currency). To date, there is no virtual semantic layer that supports parameterized columns, as discussed herein.

Therefore, the disclosed systems and methods provide a novel framework that enables the parameterization of columns within a virtual semantic layer. As discussed in more detail below, the disclosed framework enables the parameterization to be resolved at query time leading to more accurate and optimized search system. It should be understood that tables, in addition to columns, can also be parameterized in a similar manner as discussed herein without departing from the scope of the instant disclosure. Thus, while the discussion herein will focus on column parameterization, it should not be construed as limiting to the functionality and/or applicability to alternative embodiments.

In accordance with one or more embodiments, the present disclosure provides computerized methods for a novel framework that executes parameterized queries within a virtual sematic layer.

In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., a client device) cause at least one processor to perform a method for a novel and improved framework that executes parameterized queries within a virtual sematic layer.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
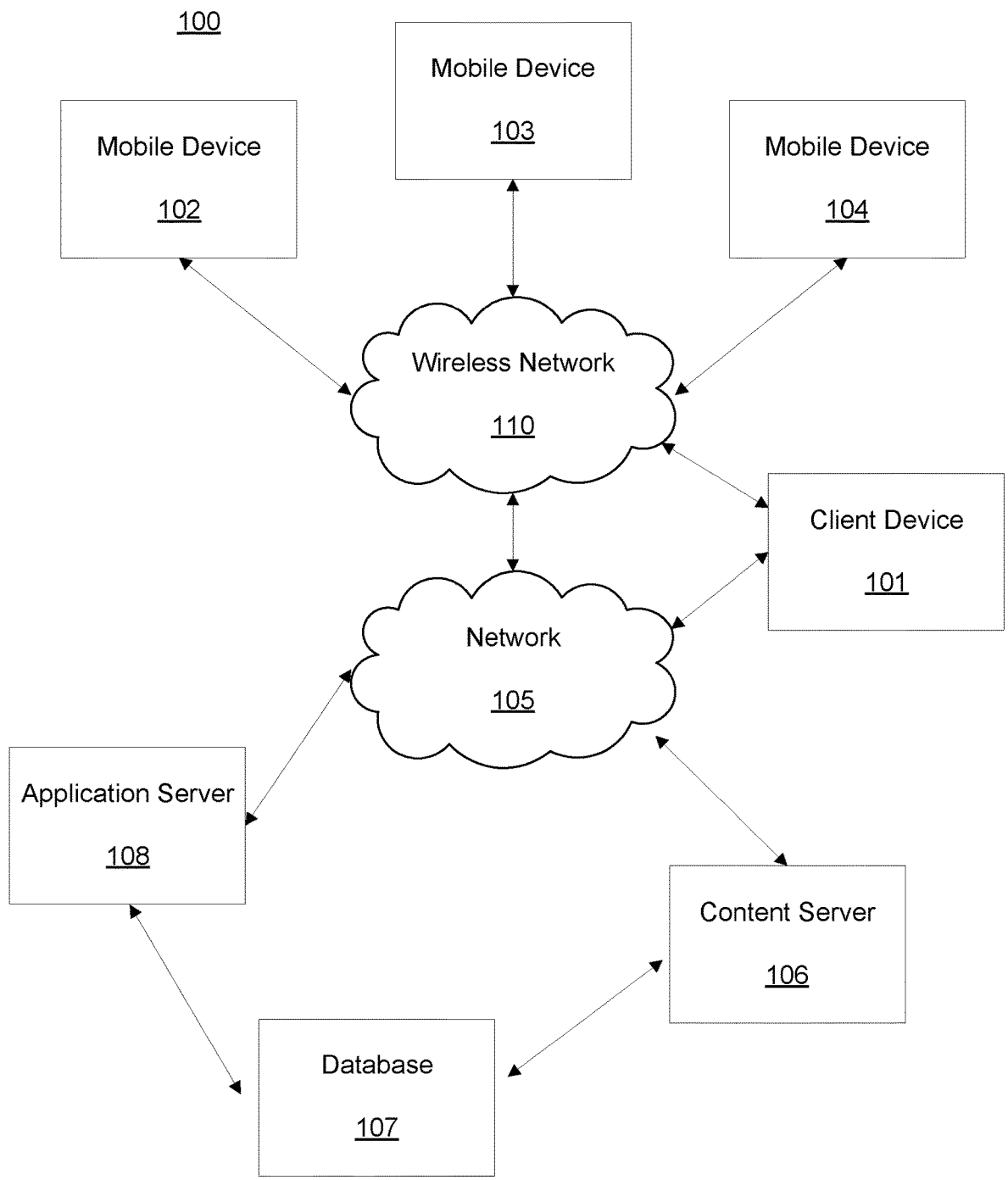
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

In some embodiments, content server 106 can be, or may be coupled or connected to, a third party server that stores online advertisements for presentation to users. In some embodiments, various monetization techniques or models may be used in connection with sponsored advertising, including advertising associated with user data, as discussed below, where ads can be modified and/or added to content based on the personalization of received content using the locally accessible user profile.

In some embodiments, users are able to access services provided by servers 106 and/or 108. This may include in a non-limiting example, search servers, authentication servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, news applications, mail applications, instant messaging applications, blog, photo or social networking applications, search applications, and the like, can be hosted by the application server 108, or content server 106 and the like.

Thus, the application server 108 and/or content server 106, for example, can store various types of applications and application related information including application data and other various types of data related to the content and services in an associated database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106 and/or 108.

Moreover, although FIG. 1 illustrates servers 106 and 108 as single computing devices, respectively, the disclosure is not so limited. For example, one or more functions of servers 106 and/or 108 may be distributed across one or more distinct computing devices. Moreover, in one embodiment, servers 106 and/or 108 may be integrated into a single computing device, without departing from the scope of the present disclosure.

Figure 2:
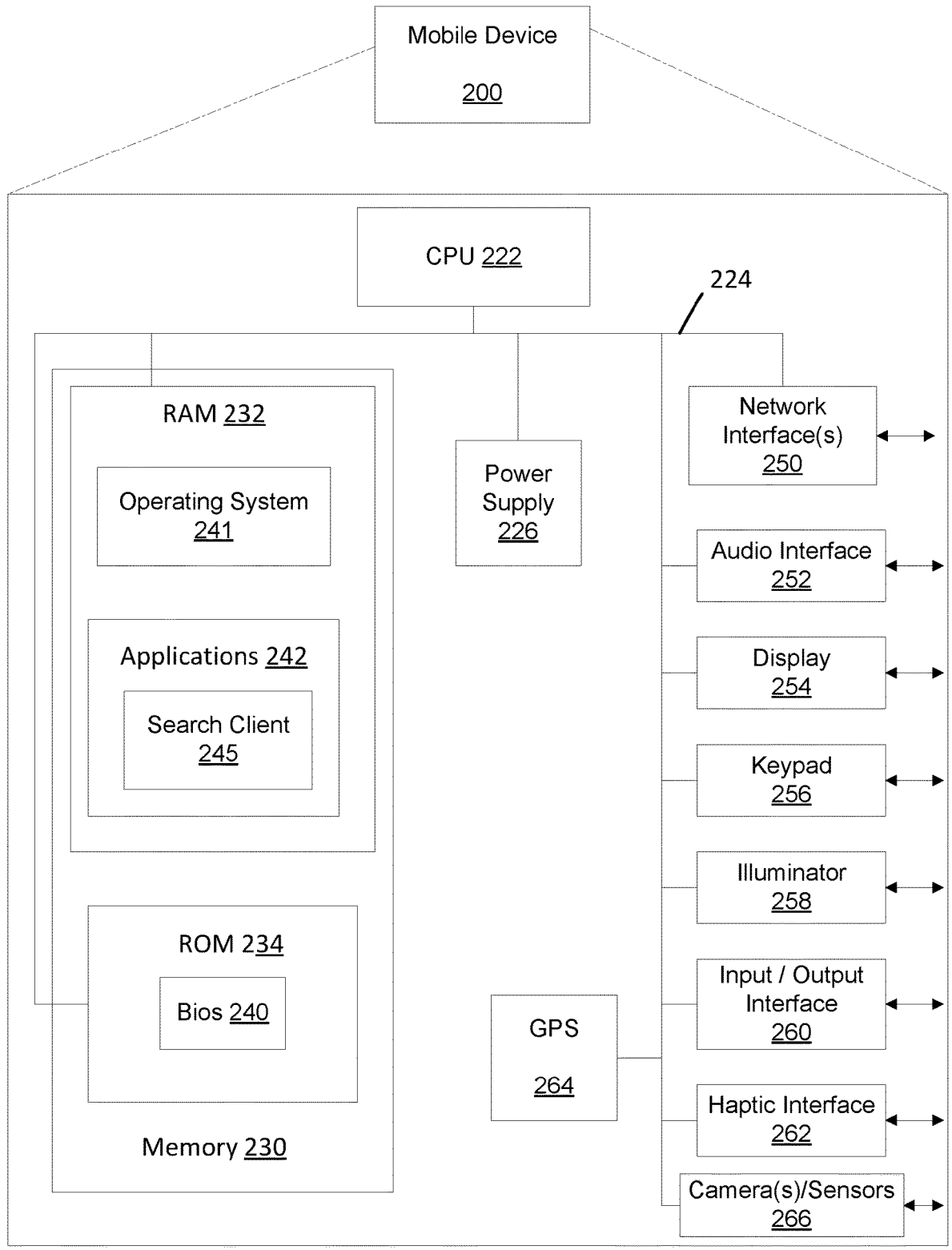
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices 101-104 discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 can be arranged to produce and receive audio signals such as, for example, the sound of a human voice. Display 254 can, but is not limited to, a include a touch sensitive screen arranged to receive input from an object such as a stylus or a digit from a human hand. Keypad 256 can comprise any input device arranged to receive input from a user. Illuminator 258 may provide a status indication and/or provide light.

Client device 200 also comprises input/output interface 260 for communicating with external devices. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth. In some embodiments however, Client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
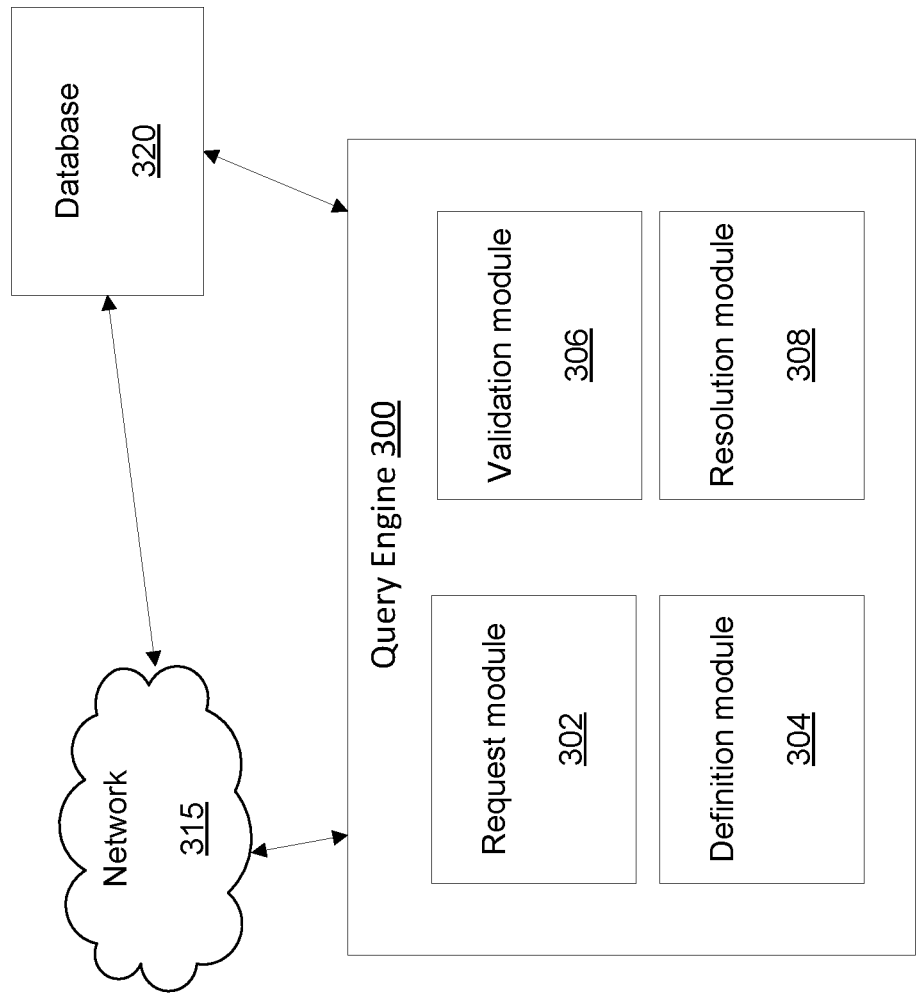
FIG. 3 is a block diagram illustrating components of an exemplary system in accordance with some embodiments of the present disclosure.

FIG. 3 is a block diagram illustrating the components for performing the systems and methods discussed herein. FIG. 3 includes query engine 300, network 315 and database 320. The query engine 300 can be a special purpose machine or processor and could be hosted by a network server (e.g., cloud web services server(s)), messaging server, application server, content server, social networking server, web server, search server, content provider, third party server, user's computing device, and the like, or any combination thereof.

According to some embodiments, query engine 300 can be embodied as a stand-alone application that executes on a networking server. In some embodiments, the query engine 300 can function as an application installed on the user's device, and in some embodiments, such application can be a web-based application accessed by the user device over a network. In some embodiments, the query engine 300 can be configured and/or installed as an augmenting script, program or application (e.g., a plug-in or extension) to another application or portal data structure.

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content, content and/or service providers, third party websites and the like.

In some embodiments, such information can be stored and indexed in the database 320 independently and/or as a linked or associated dataset. An example of this is look-up table (LUT). As discussed above, it should be understood that the data (and metadata) in the database 320 can be any type of information and type, whether known or to be known, without departing from the scope of the present disclosure.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the query engine 300, and the database of stored resources 320. Indeed, as illustrated in FIG. 3, the query engine 300 and database 320 can be directly connected by any known or to be known method of connecting and/or enabling communication between such devices and resources.

The principal processor, server, or combination of devices that comprise hardware programmed in accordance with the special purpose functions herein is referred to for convenience as query engine 300, and includes request module 302, definition module 304, validation module 306 and resolution module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
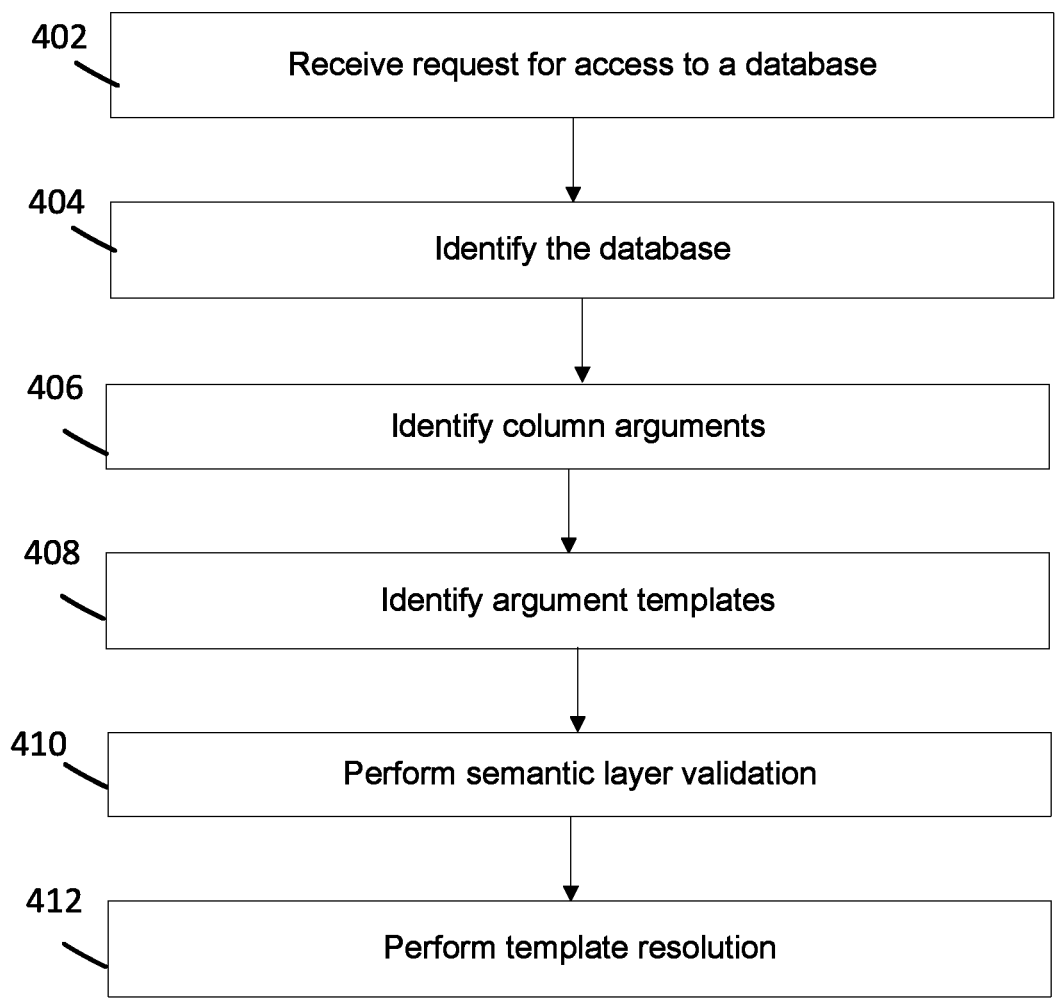
FIG. 4 is a block diagram illustrating an exemplary data flow in accordance with some embodiments of the present disclosure.

Turning to FIG. 4, Process 400 details non-limiting example embodiments for the parameterization of columns within a templated virtual sematic layer. Engine 300, as mentioned above and evident from the discussion below, enables the parameterization of columns, which can be utilized during generation of a query and during execution of the query (e.g., at query time).

A data schema is a design or configuration of a database that represents the storage of the data within the database. At a high level, the data schema can describe both the organization of data and the relationships between the data stored in the database. This relationship can provide information indicating which data is necessary for other functions, forms or types of data, and how they are connected to each other. For example, a data schema can describe a table and its columns. Each column can have a name and a data type (e.g., integer, text, and the like).

Currently, there are two kinds of general data schemas in a virtual semantic layer: 1) a logical model (i.e., what is exposed to end users), and 2) a physical model (i.e., what is stored in the database).

In a virtual semantic layer, a logical model can also have a definition, referred to as a native SQL fragment. The native SQL fragment can refer to: i) zero or more other columns in the logical model (e.g., Logical Column References); ii) zero or more columns in the physical model of the current table (Physical Column Reference); iii) zero or more columns in a different logical model that requires a table join to access (Logical Join Reference); and iv) zero or more columns in a different physical model that requires a table join to access (Physical Join Reference).

Because a column definition can reference other column definitions, each column definition can be represented as a tree (e.g., a column reference tree) where each node in the tree can be a column definition, and each edge can be a reference to another column. Column references in a virtual semantic layer can be specified as template variables in a column definition.

Currently, there are four kinds of general template variables in a virtual semantic layer: i) logical column references; ii) physical column references; iii) logical join reference; and iv) physical join reference.

In some embodiments, a logical column reference is a variable name that refers to another logical column in the semantic model. In some embodiments, the template can have the form: {{logicalName}}.

In some embodiments, a physical column reference is a variable name that refers to a physical database column. In some embodiments, the template can have the form: {{$physicalName}}, where the "$" denotes the physical database.

In some embodiments, a logical join reference is a variable name that refers to a logical column in a different semantic model that requires a table join to access. In some embodiments, the template can have the form {{joinName1.joinName2.logicalName}}.

In some embodiments, a physical join reference is a variable name that refers to a physical column in a different semantic model that requires a table join to access. In some embodiments, the template can have the form {{joinName1.joinName2.joinNameN.$physicalName}}.

As discussed herein, the disclosed framework adds a fifth kind of templated expression (and associated rules), which can expand column arguments and lead to the never-before expressed relationships between columns of a table or database. In some embodiments, therefore, a parameterized column can be added which enables a more efficient search compilation and/or search execution at query time.

According to some embodiments, Steps 402-404 of Process 400 can be performed by request module 302 of query engine 300; Steps 406-408 can be performed by definition module 304; Step 410 (and its sub-steps in FIG. 5) can be performed by validation module 306; and Step 412 can be performed by resolution module 308.

Process 400 begins with Step 402 where a request to access a database is received. In some embodiments, the request corresponds to a user desiring to generate a query. In some embodiments, the request can comprise information related to, but not limited to, a variable, type of data, a value of data, and the like, or some combination thereof. For example, the request can be generated by an analyst providing information related to a type of currency and its value.

In some embodiments, the database includes a plurality of electronically stored information organized into columns and/or tables, as discussed above.

In some embodiments, this request can be in accordance with a search for or a request for an electronic resource stored in a database. In some embodiments, the request can be associated with a specific query and/or an overall configuration of query log information stored in a database. In some embodiments, this request can be based on an analysis or technician associated with a service or content provider requesting input to configure and/or inspect a database. In some embodiments, the requested database can be associated with a particular service and/or house/store particular types of data (e.g., revenues, currencies, click rates for advertising partners, and the like).

In Step 404, based on the request from Step 402, the database is identified. In some embodiments, the identification of the database can also enable access. For example, engine 300 may be granted write access (e.g., administrator privileges) to perform the disclosed column parameterization.

In Step 406, engine 300 identifies (or defines) the column arguments that are referenced by, identified by or determined to correspond to the request. For example, if the request corresponds to a currency and a currency value, then the columns identified can correspond to currency types and currency values.

According to some embodiments, each column in a virtual semantic layer can include and/or be extended to include zero or more arguments. An argument (or argument definition) can include information related to: i) argument name; ii) argument data type (e.g., number, text, and the like); iii) default value; iv) whether or not the argument is required; and/or iv) metadata related to the argument (e.g., legal values, description, type-ahead search location(s), and the like).

Therefore, in some embodiments, Step 406 can involve identifying a set of arguments for a set of identified columns, and/or arguments for each identified column that correspond to the specifically identified information in the request.

In Step 408, engine identifies (or defines) argument templates for the identified columns (from Step 406). According to some embodiments, an argument template can include information related to a column reference and a column argument reference.

In some embodiments, a column reference(s) can appear in a templated SQL fragment(s) for a column definition(s) (e.g., a templated native SQL fragment that defines a measure or dimension) and a join definition(s) (e.g., a templated native SQL fragment that joins two tables together (which represents the ON clause in SQL).

In some embodiments, a column argument reference can take one of two forms and be defined as follows: {{$$column.arg.argumentName}} or {{sql table='tableName'column='columnName[arg1:value1][arg2:value2]'}}.

{{$$column.arg.argumentName}} references an argument value by its current name. The substituted argument value has either been supplied by the end user or is set to its default value.

{{sql table='tableName' column='columnName[arg1:value1][arg2:value2]'}} references another logical column and supplies some or all of its arguments. This form can be useful when a column definition references another column definition and the value of some or all of the argument values are to be overridden (or edited, as discussed below). It should be noted that any argument not specified is assumed to be provided from the calling context (e.g., the referencing column or user query).

According to some embodiments, for columns in a semantic layer, the arguments of the columns may also be defined. According to some embodiments, the definition of the argument can be based on the measure definition that leverages the column argument. In some embodiments, such argument template can be defined as follows:

{
name: highScore
type: INTEGER
definition: '{{$$column.args.aggregation}}({{$highScore}})'
arguments: [
name: aggregation
type: TEXT
values: [SUM, MIN, MAX]
default: 'SUM'
}
]
}

By way of a non-limiting example, below is an example of a column argument in a join clause:
{
name: totalCost
type: MONEY
definition: 'SUM({{$cost}})*{{rates.currentRate}}'
arguments: [
{
name: currency
type: TEXT
tableSource: rates.id

If there is no default value, the argument is required.
This argument is referenced in the join on clause so no default should exist here

}
{
name: format
type: TEXT
default: '$0.00'

No tableSource or values indicates context aware filtering is not supported.

}
]
}

In some embodiments, a join definition for the above example can be as follows:
{
name: rates
to: currencyRates
kind: toOne
type: left

This join is parameterized on a particular column's arguments.

definition: '{{rates.$id}}={{$$column.args.currency}} AND {{rates.$date}}={{date}}'
}

According to some embodiments, when defining a parameterized column that references another parameterized column, all required arguments in the dependent column must be defined in the referencing column (e.g., there are no implicit or inherited arguments). This has a number of advantages with respect to argument overrides. For example, it provides the ability to override the default value of a dependent column argument with a new default value. Another advantage is that it provides the ability the ability to remove a required argument from a dependent column by pinning it to a new default value. And, yet another advantage is that it provides the ability to remove a required argument from a dependent column by pinning it to a fixed, non-default value. In some embodiments, overriding the type of an argument can be forbidden and can result in an error during configuration processing.

In Step 410, engine 300 performs semantic layer validation based on the identified column arguments and argument templates (from Steps 406-408). According to some embodiments, the validation processing performed by engine 300 can involve determining that each argument is unique; that is, that each argument is referencing another column or argument in another column. In some embodiments, this can involve determining that the "argument name" of the argument is unique (or not shared by another argument in the same column).

Figure 5:
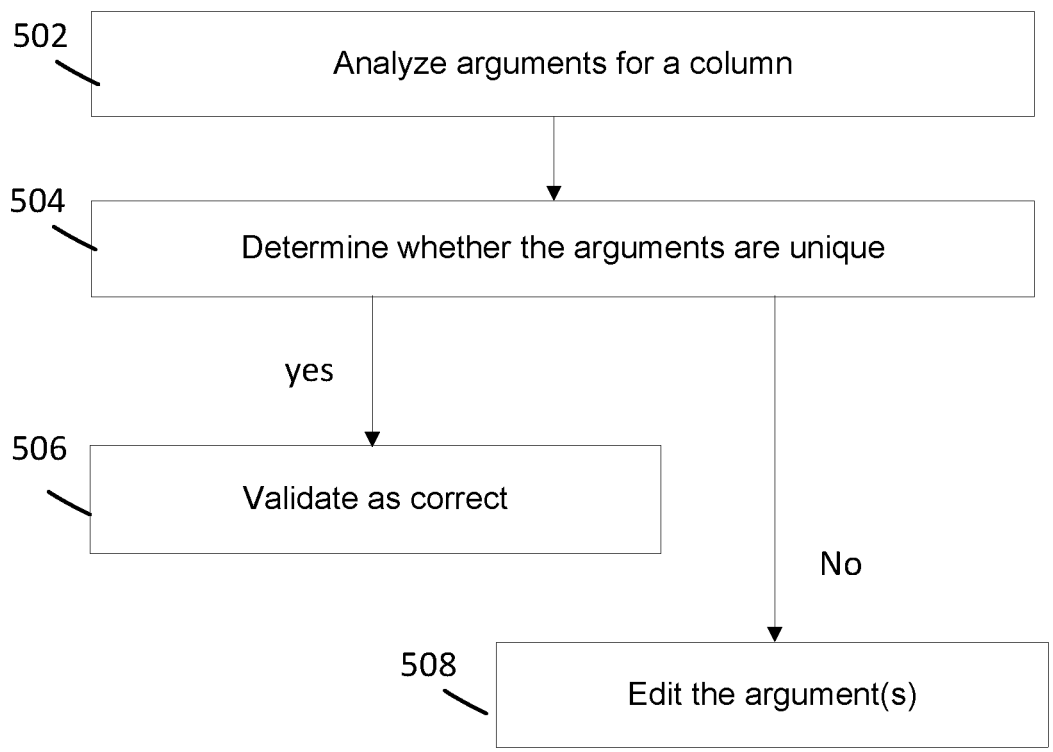
FIG. 5 is a block diagram illustrating exemplary data flows in accordance with some embodiments of the present disclosure.

Some embodiments of the processing of Step 410 are discussed herein in relation to FIG. 5, which provides Steps 502-508 that are sub-steps of Step 410.

In Step 502, a column within a set of columns (from Step 408) are identified, and the arguments of the column are identified. The processing of Step 502-508 can be performed for each column in the set (e.g., each column that is to be parameterized, as discussed above).

In Step 504, the information of the arguments (or argument definitions) are analyzed, and engine 300 determines whether the definitions of the arguments are unique (e.g., are different from other arguments in a same column, for example). If they are different, then processing proceeds from Step 504 to Step 506 where the parameterization of the semantic layer is validated.

If engine 300 determines that the arguments are not unique, then engine 300 proceeds to Step 508 where the argument(s), or at least a portion of the argument's definition, can be edited (or modified, or overridden, as discussed above). Upon modification, in some embodiments, validation of the modified definitions can be performed in a similar manner as discussed above in relation to Steps 504-506.

According to some embodiments, a semantic layer definition is often a separate artifact that can be created and maintained independently from other components of an analytic system. Every edit may need to be validated on demand or before it is deployed to ensure correctness.

By way of a non-limiting example embodiments, according to some embodiments of the processing of Step 410, validation can involve determining whether argument names are unique for a given column.

For example, if a column definition (column A) references another column (column B), and column B has a required argument (argument X), column A must either: i) also define argument X; or ii) expand column B directly with the {{sql . . . }} template syntax and supply the value for argument X (e.g., Step 508).

In another non-limiting example, if a column definition (column A) references another column (column B), and both column A and column B have the same argument definition (argument X), argument X must have the same data type in both definitions.

At the conclusion of the processing of Steps 502-510 of FIG. 5, the sematic layer can be considered validated (e.g., through determinations that column arguments are valid and unique, as discussed above), and processing continues from Step 410 to Step 412.

In Step 412, engine 300 performs template resolution processing on the validated semantic layer. Step 412 ensures that there are no conflicts with arguments within the semantic layer and/or parameterized columns and their respective arguments. According to some embodiments, template resolution processing performed by engine 300 can be an iterative process that can expand a reference tree for a (validated or parameterized) column.

In some embodiments, Step 412 can involve engine 300 identifying the validated semantic layer and its columns, as discussed above in relation to Step 410, then identifying the reference tree for each identified column. Engine 300 can then perform the resolution processing of Step 412 by first analyzing a column's reference tree to identify which template variables (or column arguments) are in need of expansion, then on a subsequent traversal(s), expanding those identified variables. In some embodiments, subsequent traversals of the reference tree may be required to ensure that all variables of need of expansion are identified and expanded appropriately. With each pass, any unexpanded template variables in the current definition can be expanded, and the resolution processing of Step 412 is completed when the reference tree has been traversed and no more variables are identified or determined as requiring expansion. Thus, in some embodiments, Step 412 can be recursively performed until it is determined that resolution is complete.

In some embodiments, a column argument (or template variable) can be provided in one of several ways. In some embodiments, i) an argument can be pinned in the semantic layer definition using the {{sql . . . }} template function; ii) an argument can be provided by the end user in a request or query (e.g., Step 402); iii) an argument can be provided as a default value.

According to some embodiments, from the perspective of column definition expansion performed during Step 412's processing, an argument value is assigned in the following priority order: i) argument pinned in the calling context. ({{sql . . . }} template function); ii) argument set in the calling context (e.g., user query or referencing column default value); and iii) default argument value in the current column definition.

Thus, according to some embodiments, as engine 300 traverses the columns of the semantic layer that are validated in Step 410, engine 300 can expand upon the arguments/variables that are need of expansion based upon the above argument expansions. The result of the resolution processing of the validated columns (of Step 410) is the parameterization of columns within the virtual semantic layer. In some embodiments, as mentioned above, this can be performed in response to a request from a user, and/or can be performed at query time in response to a specific query for information housed within a database.

Therefore, the steps and sub-steps of Process 400 enables columns to be parameterized for efficient query generation and search optimization. Engine 300's execution of Process 400's steps (and sub-steps) enables a database and/or its associated semantic layer to be construed, modified and/or configured according to a hierarchy, and/or with types of metadata, that corresponds to the determined column relationships. This not only reduces the amount of data stored and reduces the time to process queries, but also enables a more streamlined approach for searches to be constructed and executed, which can increase the performance of the database and the operations of systems that are backed by the database.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   identifying, by a device, a database comprising information organized into a plurality of columns;
   identifying, by the device, a set of columns from the plurality of columns, the set of columns comprising data that corresponds to a variable;
   identifying, by the device, arguments for each column in the set of columns;
   identifying, by the device, an argument template for each column in the set of columns based on the identified arguments, each argument template comprising a column reference and a column argument reference;
   performing, by the device, semantic layer validation for each column of the set of columns based on the identified argument templates and identified arguments;
   performing, by the device, template resolution for each column on the set of columns, the template resolution causing parameterization of each column in the set of columns, such that a virtual semantic layer of the database is modified and configured to a particular hierarchy, the template resolution comprising, for each column in the set of columns:
   identifying a column reference tree, the column reference tree comprising references to each other column and their respective column arguments;
   analyzing the column reference tree and identifying which arguments require expansion based on identified conflicts;
   recursively traversing the column reference tree; and
   modifying variables of the identified arguments until no more arguments are determined to require expansion; and
   executing, by the device, a logical model associated with the virtual semantic layer, the execution causing the creation of a complex query of the database via the particular hierarchy.

2. The method of claim 1, the semantic layer validation comprising, for each column in the set of columns:
   analyzing information related to the arguments in a column; and
   determining, based on the analysis, whether each argument is unique within the column, wherein when an argument is determined to be unique, validating the argument as correct, and when an argument is determined to not be unique, editing the argument.

3. The method of claim 2, wherein the argument information corresponds to an argument name, wherein the determination is based on whether the argument name is shared with another argument in the column.

4. The method of claim 1, wherein the arguments for each column comprise information related to an argument value, argument data type, default value; whether the argument is required and metadata of the argument.

5. The method of claim 1, wherein a column reference corresponds to a column definition that defines a measure or dimension, wherein the column reference is configured as a templated Structured Query Language (SQL) fragment.

6. The method of claim 1, wherein a column reference corresponds to a join definition that joins two tables together, wherein the column reference is configured as a templated Structured Query Language (SQL) fragment.

7. The method of claim 1, wherein a column argument reference is referenced as {$$column.arg.argumentName}}, wherein {$$column.arg.argumentName}} references an argument value by its current name.

8. The method of claim 1, wherein a column argument reference is referenced as
   {{sql table='tableName' column='columnName[arg1: value1][arg2:value2]'}}, wherein column='columnName[arg1:value1][arg2:value2]'}} references another logical column and supplies some or all of its arguments.

9. The method of claim 1, further comprising:
   receiving, by the device, a request from a user, the request comprising information related to the variable, wherein the identification of the set of columns is based on the request.

10. A non-transitory computer-readable storage medium tangibly encoded with computer-executable instructions, that when executed by a processor associated with a device, performs a method comprising:
    identifying, by the device, a database comprising information organized into a plurality of columns;
    identifying, by the device, a set of columns from the plurality of columns, the set of columns comprising data that corresponds to a variable;
    identifying, by the device, arguments for each column in the set of columns;

identifying, by the device, an argument template for each column in the set of columns based on the identified arguments, each argument template comprising a column reference and a column argument reference;

performing, by the device, semantic layer validation for each column of the set of columns based on the identified argument templates and identified arguments;

performing, by the device, template resolution for each column on the set of columns, the template resolution causing parameterization of each column in the set of columns, such that a virtual semantic layer of the database is modified and configured to a particular hierarchy, the template resolution comprising, for each column in the set of columns:

identifying a column reference tree, the column reference tree comprising references to each other column and their respective column arguments;

analyzing the column reference tree and identifying which arguments require expansion based on identified conflicts;

recursively traversing the column reference tree; and modifying variables of the identified arguments until no more arguments are determined to require expansion; and executing, by the device, a logical model associated with the virtual semantic layer, the execution causing the creation of a complex query of the database via the particular hierarchy.

11. The non-transitory computer-readable storage medium of claim 10, the semantic layer validation comprising, for each column in the set of columns:

analyzing information related to the arguments in a column; and determining, based on the analysis, whether each argument is unique within the column, wherein when an argument is determined to be unique, validating the argument as correct, and when an argument is determined to not be unique, editing the argument.

12. The non-transitory computer-readable storage medium of claim 11, wherein the argument information corresponds to an argument name, wherein the determination is based on whether the argument name is shared with another argument in the column.

13. The non-transitory computer-readable storage medium of claim 10, wherein the arguments for each column comprise information related to an argument value, argument data type, default value; whether the argument is required and metadata of the argument.

14. The non-transitory computer-readable storage medium of claim 10, wherein a column reference corresponds to one of a column definition and a join definition, the column definition defining a measure or dimension, the join definition joining two tables together, each column reference configured as a templated Structured Query Language (SQL) fragment.

15. The non-transitory computer-readable storage medium of claim 10, wherein a column argument reference is referenced as one of {$$column.arg.argumentName}} and {{sql table='tableName' column='columnName[arg1: value1][arg2:value2]'}}, wherein {$$column.arg.argumentName}} references an argument value by its current name, and wherein column='columnName[arg1:value1][arg2: value2]'}} references another logical column and supplies some or all of its arguments.

16. A device comprising:

a processor configured to:

identify a database comprising information organized into a plurality of columns;

identify a set of columns from the plurality of columns, the set of columns comprising data that corresponds to a variable;

identify arguments for each column in the set of columns;

identify an argument template for each column in the set of columns based on the identified arguments, each argument template comprising a column reference and a column argument reference;

perform semantic layer validation for each column of the set of columns based on the identified argument templates and identified arguments;

perform template resolution for each column on the set of columns, the template resolution causing parameterization of each column in the set of columns, such that a virtual semantic layer of the database is modified and configured to a particular hierarchy, the template resolution comprising, for each column in the set of columns:

identifying a column reference tree, the column reference tree comprising references to each other column and their respective column arguments;

analyzing the column reference tree and identifying which arguments require expansion based on identified conflicts;

recursively traversing the column reference tree; and modifying variables of the identified arguments until no more arguments are determined to require expansion; and execute a logical model associated with the virtual semantic layer, the execution causing the creation of a complex query of the database via the particular hierarchy.

17. The device of claim 16, for the semantic layer validation, for each column in the set of columns, the processor is further configured to:

analyze information related to the arguments in a column; and determine, based on the analysis, whether each argument is unique within the column, wherein when an argument is determined to be unique, validate the argument as correct, and when an argument is determined to not be unique, edit the argument.

* * * * *